(12) United States Patent
Barajas et al.

(10) Patent No.: US 8,369,992 B2
(45) Date of Patent: Feb. 5, 2013

(54) EMBEDDED DIAGNOSTIC, PROGNOSTIC, AND HEALTH MANAGEMENT SYSTEM AND METHOD FOR A HUMANOID ROBOT

(75) Inventors: Leandro G. Barajas, Troy, MI (US); Adam M Sanders, Holly, MI (US); Matthew J Reiland, Oxford, MI (US); Philip A Strawser, Houston, TX (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 478 days.

(21) Appl. No.: 12/564,083

(22) Filed: Sep. 22, 2009

(65) Prior Publication Data

US 2011/0071679 A1 Mar. 24, 2011

(51) Int. Cl.
*G05B 19/00* (2006.01)
(52) U.S. Cl. ............ 700/259; 700/245; 700/248; 706/1; 706/12; 706/912; 601/5; 601/33; 702/19; 702/34
(58) Field of Classification Search .................. 700/248, 700/259, 245; 702/19, 34; 706/1, 12, 912; 601/5, 33
See application file for complete search history.

(56) References Cited

U.S. PATENT DOCUMENTS

| | | | |
|---|---|---|---|
| 4,925,312 A * | 5/1990 | Onaga et al. .................. 700/261 |
| 6,438,454 B1 | 8/2002 | Kuroki | |
| 7,446,496 B2 | 11/2008 | Ogawa et al. | |
| 8,204,626 B2 * | 6/2012 | Yoshiike et al. .............. 700/260 |
| 2004/0164697 A1 | 8/2004 | Iribe | |
| 2006/0033462 A1 | 2/2006 | Moridaira | |
| 2006/0214621 A1 | 9/2006 | Ogawa et al. | |
| 2010/0016766 A1 * | 1/2010 | Zhang et al. .................. 601/5 |
| 2010/0312388 A1 * | 12/2010 | Jang et al. .................... 700/248 |
| 2011/0319815 A1 * | 12/2011 | Roelle et al. ............... 604/95.01 |
| 2011/0319910 A1 * | 12/2011 | Roelle et al. ................. 606/130 |

FOREIGN PATENT DOCUMENTS

| | | |
|---|---|---|
| DE | 19517852 A1 | 12/1995 |
| DE | 112006003044 T5 | 10/2008 |
| EP | 0923011 A2 | 6/1999 |
| JP | 2001150374 A | 6/2001 |
| JP | 2003211379 A | 7/2003 |
| JP | 2006000966 A | 1/2006 |
| JP | 2006171960 A | 6/2006 |
| JP | 2009037424 A | 2/2009 |
| WO | 2009064125 A2 | 5/2009 |

\* cited by examiner

OTHER PUBLICATIONS http://robotics.nasa.gov/courses/fall2002/event/oct1/NASA_Robotics_20021001.htm.

*Primary Examiner* — James Trammell
*Assistant Examiner* — McDieunel Marc
(74) *Attorney, Agent, or Firm* — Quinn Law Group, PLLC

(57) ABSTRACT

A robotic system includes a humanoid robot with multiple compliant joints, each moveable using one or more of the actuators, and having sensors for measuring control and feedback data. A distributed controller controls the joints and other integrated system components over multiple high-speed communication networks. Diagnostic, prognostic, and health management (DPHM) modules are embedded within the robot at the various control levels. Each DPHM module measures, controls, and records DPHM data for the respective control level/connected device in a location that is accessible over the networks or via an external device. A method of controlling the robot includes embedding a plurality of the DPHM modules within multiple control levels of the distributed controller, using the DPHM modules to measure DPHM data within each of the control levels, and recording the DPHM data in a location that is accessible over at least one of the high-speed communication networks.

17 Claims, 3 Drawing Sheets

EMBEDDED DIAGNOSTIC, PROGNOSTIC, AND HEALTH MANAGEMENT SYSTEM AND METHOD FOR A HUMANOID ROBOT

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the control of a humanoid robot, and in particular to the diagnosis, prognosis, and health management (DPHM) of a dexterous humanoid robot.

BACKGROUND OF THE INVENTION

Robots are automated, autonomous, or remotely-operated devices that are able to manipulate objects using a series of links, which in turn are interconnected via articulations or motor-driven robotic joints. Each joint in a typical robot represents an independent control variable, also referred to as a degree of freedom (DOF). End-effectors are the links used for performing a task at hand, e.g., grasping a work tool or an object. Therefore, precise control of a robot may be organized by the level of task specification: object level control, i.e., the ability to control the behavior of an object held in a single or cooperative grasp of a robot, end-effector control, and joint control. Collectively, the various control areas cooperate to achieve the required functionality.

Humanoid robots in particular are configured with an approximately human structure, functionality, and/or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise position control must be applied within the different spaces noted above, as well as control over the applied torque or force, motion, and the various grasp types.

Robot control architectures typically provide only low-level diagnostic information, such as threshold-based fault detection and isolation. Such post-fault detection and isolation approaches are used mainly during system deployment or fault recovery modes, and therefore may provide a less than optimal approach to Integrated Life Cycle Management. Likewise, the high cost of scaling and integrating new control functionality into an extremely complex electro-mechanical system such as the 42+ DOF humanoid robot described herein may pose especially problematic system development and interfacing issues.

SUMMARY OF THE INVENTION

Accordingly, a framework is provided herein that designs and seamlessly integrates or embeds modular diagnostic, prognostic, and health management (DPHM) functionality within multiple levels of a distributed control system prior to any commissioning of the robotic system. Such an integrated, bottom-up design approach allows system-wide observation and control while facilitating the maintainability and extensibility of the robotic system at its constituent software and hardware levels. Scalable features or command modules may be deployed with variable levels of depth and breadth to meet evolving application requirements and constraints, ultimately reducing system development, execution, and maintenance costs.

In some existing robotic control systems, static bits or bitmaps may represent the current state of the system using a status register. Lookup tables may also be used to convert error bits into human-readable messages that are then presented to a user during system diagnostics. However, post-commissioning integration of DPHM functionality may quickly become impracticable as system complexity increases. System prognosis and health information may not be retained, if such data is even collectable at all. Instead, data driven by hard threshold-triggered fault or failure states may be collected and recorded to provide limited post-failure event fault detection and isolation. In part to address such limitations, the present invention directly designs modular DPHM functionality into the robotic system by embedding individual DPHM modules within each of the various levels of control of a distributed robotic controller.

In particular, a robotic system is provided herein that includes a robot having a plurality of integrated system components, including a plurality of compliant robotic joints, actuators each adapted for moving one of the robotic joints, and sensors adapted for measuring control and feedback data at a plurality of control points of the robotic system. The robotic system also includes a controller having multiple distributed control levels, with the controller controlling the integrated system components via the multiple distributed control levels and over multiple high-speed communication networks.

The controller includes a plurality of embedded diagnostic, prognostic, and health management (DPHM) modules, at least one of which is embedded within each of the integrated system components, each of the DPHM modules being adapted for measuring and controlling DPHM data and system behavior for a respective one of the integrated system components, and for recording the DPHM data in a location that is accessible over the high-speed communication networks.

The robotic system may include multiple computational control nodes, which may be embodied as embedded printed circuit board assemblies (PCBA) or processors or external workstation computers, depending on the level of control, which automatically communicate over the different networks to control and coordinate functions of the various integrated system components, e.g., compliant joints, relays, lasers, lights, electro-magnetic clamps, etc. The robot itself has multiple synchronized joints, e.g., shoulders, elbows, neck, waist, wrists, fingers, thumbs, etc., that can move together in a synchronized manner to conduct a particular action. Such a humanoid robot can have many times the number of degrees of freedom (DOF) or directional control variables of a conventional robot. As a result, any control system attempting to coordinate and control such a complex system must quickly process control and feedback data that is orders of magnitude greater in volume than the data encountered in conventional robot control systems.

The distributed controller is "distributed" in the sense that it may include a command-level controller for transmitting a control signal commanding a performance of an autonomous task by the robot, multiple embedded joint-level controllers for controlling motion of a respective one of the robotic joints or another integrated system component, and a joint coordination-level controller for receiving the command signal from the command-level controller and coordinating actions of the robotic joints and other integrated system components in response thereto. A plurality of DPHM modules are embedded within the robotic system at the various control levels, i.e., within the controller themselves as well as in the various devices connected thereto. Each DPHM module automatically determines DPHM information for the controller/device within which the module is embedded, with the data thereafter recorded in a location that is readily accessible over the communication networks, or using an external DPHM device such as when the various networks are temporarily unavailable.

A method is also provided herein for controlling a robot having a plurality of integrated system components including compliant robotic joints, a plurality of actuators, and a plurality of sensors adapted for determining feedback data at a corresponding one of the robotic joints. The method includes embedding a plurality of DPHM modules within multiple control levels of a distributed controller having multiple high-speed communication networks, using the DPHM modules to measure DPHM data within each of the control levels, and recording the DPHM data in a location that is accessible over at least one of the high-speed communication networks.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
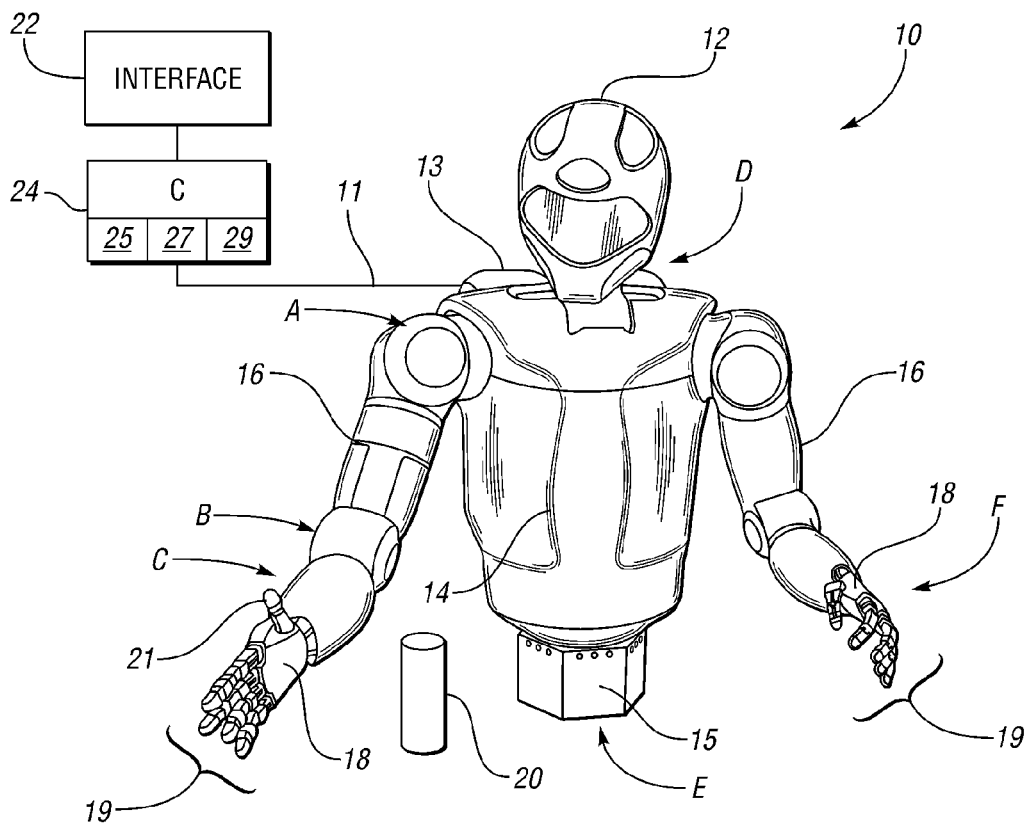
FIG. 1 is a schematic illustration of a humanoid robot having a distributed control framework with distributed diagnostic, prognostic, and health management (DPHM) modules.

With reference to the drawings, wherein like reference numbers refer to the same or similar components throughout the several views, FIG. 1 shows a robotic system having a distributed control system or controller (C) 24 and a dexterous humanoid robot 10 controlled thereby. The robot 10 is adapted to perform one or more autonomous tasks with multiple degrees of freedom (DOF). According to one embodiment, the robot 10 is configured with a plurality of independently and interdependently-moveable robotic joints, such as but not limited to a shoulder joint (arrow A), an elbow joint (arrow B), a wrist joint (arrow C), a neck joint (arrow D), and a waist joint (arrow E), as well as the various finger joints (arrow F) positioned between the phalanges of each robotic finger 19.

Each robotic joint may have one or more DOF. For example, certain joints such as the shoulder joint (arrow A), the elbow joint (arrow B), and the wrist joint (arrow C) may have at least two DOF in the form of pitch and roll. Likewise, the neck joint (arrow D) may have at least three DOF, while the waist (arrow E) may have one or more DOF. Depending on task complexity, the robot 10 may move with over 42 DOF.

Each robotic joint contains and is internally-driven by one or more actuators, e.g., joint motors, series elastic actuators, linear actuators, rotary actuators, and the like.

The humanoid robot 10 may include a head 12, torso 14, waist 15, arms 16, hands 18, fingers 19, and thumbs 21, with the various joints noted above being disposed within or therebetween. The robot 10 may also include a task-suitable fixture or base (not shown) such as legs, mobile platforms, rails, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, or the supply 13 may be external to the robot and connected thereto via power cables, to provide sufficient electrical energy to the various joints for movement of the same.

Although not shown in FIG. 1 for simplicity, each robotic joint contains and is driven by one or more actuators, e.g., joint motors, linear actuators, series elastic actuators, other rotary actuators, electrically-controlled antagonistic tendons, and the like. The robotic system includes multiple computational control nodes, i.e., embedded printed circuit board assemblies (PCBA) or processors and external workstation computers, which automatically communicate over the different networks to control and coordinate functions of various integrated system components, for example compliant joints, relays, lasers, lights, electro-magnetic clamps, etc., and to thereby control the actions of the robot.

Figure 2:
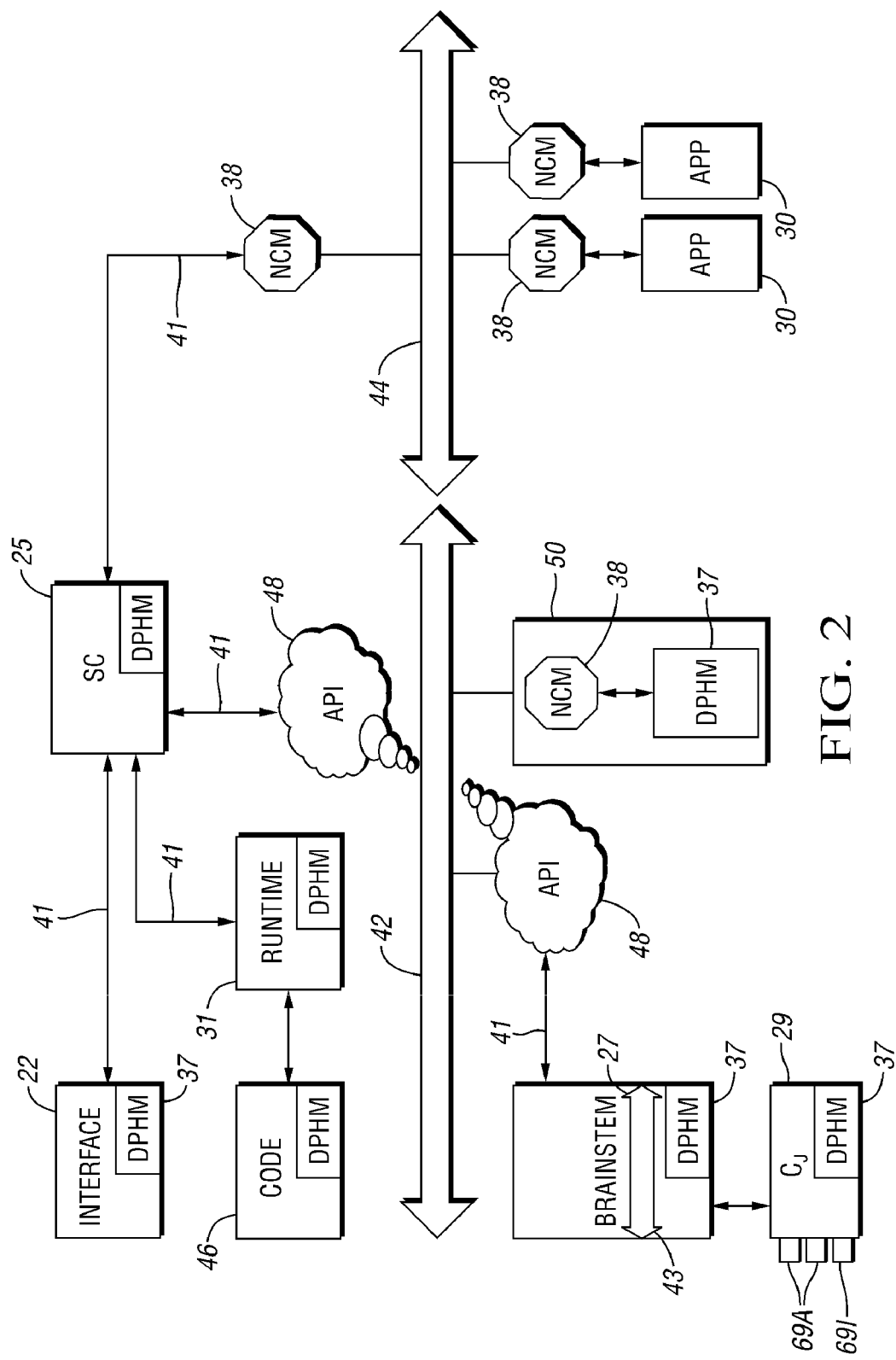
FIG. 2 is schematic illustration of a distributed control framework with DPHM modules usable with the humanoid robot of FIG. 1.

The joints of the robot 10 are compliant, as noted above, i.e., they are sufficiently non-stiff, due to the inclusion of springs within some or all of the joints, and therefore position encoders, e.g., encoders 69A and 69I of FIG. 2, may be used for the actuator or servo motors as well as for the joint itself to provide information about the force being applied to the joint. Additionally, between compliant joints there may be 6-axis force torque sensors (not shown) that gather complete force information on the status of a given compliant joint.

The distributed controller 24 provides precise motion and systems control of the humanoid robot 10, including control over the fine and gross movements needed for manipulating an object 20 that may be grasped by the fingers 19 and thumb 21 of one or more hands 18. The controller 24 is able to independently control each robotic joint in isolation from the other robotic joints, as well as interdependently control a number of the joints to fully coordinate the actions of the multiple joints in performing a relatively complex work task.

The controller 24 may include multiple digital computers or data processing devices each having one or more microprocessors or central processing units (CPU), read only memory (ROM), random access memory (RAM), electrically-programmable read only memory (EPROM), a high-speed clock, analog-to-digital (A/D) circuitry, digital-to-analog (D/A) circuitry, and any required input/output (I/O) circuitry, I/O devices, and communication interfaces, as well as signal conditioning and buffer electronics. Individual control algorithms resident in the controller 24 or readily accessible thereby may be stored in ROM and automatically executed at one or more different control levels to provide the respective control functionality.

Still referring to FIG. 1, the controller 24 is "distributed" in the sense that command-level control may be provided at a relatively macro level, which controls joint and systems coordination actions at an intermediate level, which in turn controls each joint or system involved in a particular task via multiple distributed and embedded low-level controllers. Therefore, the controller 24 may include a command-level controller referred to herein as a system commander 25, and a real-time joint-coordination controller referred to hereinafter as the brainstem 27. The controller 24 also includes multiple embedded joint-level controllers 29 which, as the description implies, are each embedded within the structure of the robot 10 in close proximity to the joint being controlled thereby, as described below. Control data and the feedback data, represented by double-arrow 11, may be exchanged between the robot 10 and the various levels of the controller 24 to ensure precise complex motion control of the robot.

Controller 24 may be configured with a user interface 22, e.g., a control panel or other human-machine interface (HMI) device. Interface 22 may be configured to separately facilitate access to the robot 10 at the operational and the programming levels. To that end, interface 22 may include a graphical user interface (GUI) providing an operator with an intuitive or menu-driven set of functional options for limited control over the robot 10. Interface 22 may also include a restricted interface providing programming access to the robot 10 by engineers, programmers, or other designated personnel having the authority to alter the core control code of the robot. As will now be explained with reference to FIGS. 2-4, the controller 24 includes diagnostic, prognostic, and health management (DPHM) functionality embedded as modules prior to system commissioning at each of the various control levels set forth above.

Referring to FIG. 2, the controller 24 may be distributed across multiple high-speed networks to provide precise control over the coordinated motion of the various joints within the robot 10 described above. That is, the system commander (SC) 25 may be tasked via interface 22 over a high-speed communications link 41 to provide general top-level control over the robot 10, with top-level commands transmitted by the system commander to the brainstem 27. For example, the system commander 25 may issue a task-based command such as "pick up an object" and "move the object to point X, Y, Z in three seconds". These commands may be transmitted or relayed over a first network 42, which in one embodiment may be an Ethernet connection or other suitable high-speed network, to the mid-level control device or brainstem 27, via an applications programming interface (API) 48. The system commander 25 may also execute programming language or code 46 during run time via a runtime engine 31.

The brainstem 27 receives the command(s) from the system commander 25 over the first network 42 via API 48, and then processes this command. Processing at the level of the brainstem 27 may include indentifying the specific integrated systems, e.g., the particular compliant joint or joints of the robot 10 shown in FIG. 1, that must be controlled to execute the requested task in the most efficient manner, as well as issuing the required activation commands to the actuator(s) moving each joint. For example, brainstem 27 may communicate a signal to a particular joint commanding that joint to move 10 degrees at a particular speed. This signal may be transmitted to each embedded joint controller ($C_J$) 29 via a second network 42, e.g., a backplane integrated within the brainstem 27 and connecting various joint and/or task-specific command modules (not shown) within, over the high-speed connections link 41.

In addition to the above devices, the controller 24 may include a collection of network communications managers (NCM) 38 configured to prioritize the communication between a given network and device. As will be understood by those of ordinary skill in the art, an NCM 38 may include software that provides a programming interface to the particular hardware device attempting to connect to a network, ensuring the device may properly connect according to the particular communications protocol used by the network.

The controller 24 may also include a third high-speed network 44, such as a multipoint low-voltage differential signaling (M-LVDS) bus according to one embodiment, that may be used to establish connectivity with connect multiple application modules (APP) 30. Each module 30 may provide top-level control or task-specific control logic for various robot capabilities. In one embodiment, the module 30 may be configured for control of certain peripheral sensory applications, e.g., haptic or touch-based sensing module, and/or a vision sensing module providing laser, radar, and/or optical-based visual perception capability. Other modules may include a sound or voice-based sensing module, e.g., speech or sound recognition, a user interface module providing user access to the robot 10, a task planning module, a tele-operation module, a reasoning module and/or a learning module for training of the robot, and/or any other module providing the desired functionality. Such environmental sensing capability or other functionality enhancing the capability of the robot 10 of FIG. 1 may be relayed to the joint level via the system commander 25 and networks 42, 43, and 44 via the links 41, NCM 38, and API 48.

The robotic system shown in FIG. 2 may include at least three encoders per compliant joint, including a pair of absolute encoders 69A and an incremental encoder 69I. The absolute encoders 69A may be configured as relatively high-resolution, low-speed encoding devices. The incremental encoder 69I may be a relatively low-resolution, high-speed device. As will be described below, measurements and readings of the encoders may be used to determine the presence of a predetermined fault condition as part of the robot's fault diagnosing and isolation capabilities.

Such a condition may include a sensor reading and fault threshold comparison, and/or may include extracting a signal slope and using the slope as a virtual variable for the threshold comparison. Alternately or concurrently, a binary signal may be used, e.g., a safety relay may provide information about the commutation state. A proximity sensor or limit switch may be configured to provide a binary signal of a discrete condition that was achieved, etc.

Still referring to FIG. 2, as noted above the controller 24 distributes control functionality between multiple control levels via the system commander 25, the brainstem 27, and the multiple embedded joint-level controllers 29, as noted above. Joint or system-level sensing, signal processing, and immediate actuator control is conducted at the joint-level via one or more printed circuit board assemblies (PCBA), which may be directly embedded within the structure of the robot, e.g., within the arms 16 in close proximity to the particular joint being controlled.

Within the intended scope of the present invention, the controller 24 likewise designs in and distributes diagnostic, prognostic, and health management (DPHM) functionality at the various control levels, i.e., system commander 25, brainstem 27, and joint-level controllers 29, and any of the connected network devices, i.e., the user interface 22, runtime engine 44, code 46, NCM 38, and application modules 30, via a series of DPHM modules 37. Another level of control functionality over the robot 10 may be provided via a DPHM master or bypass module 50, likewise having a DPHM module 37 and providing global access to any or all of the DPHM modules 37 embedded throughout the various levels of the controller 24. Such embedded DPHM functionality will now be described with reference to FIGS. 3 and 4.

Figure 3:
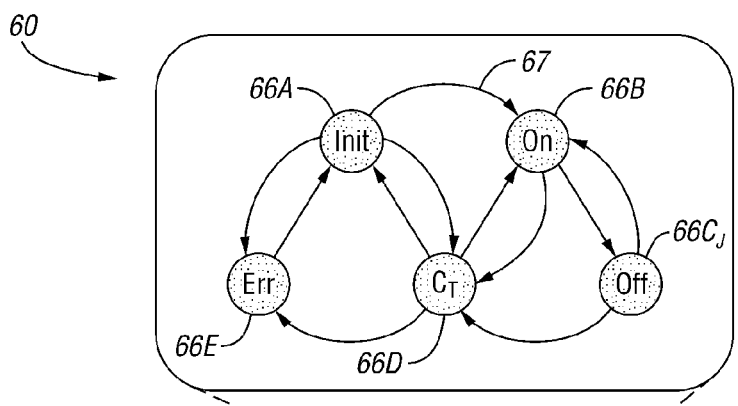
FIG. 3 is a schematic illustration describing a finite state machine of the type that may be used with the distributed control framework of FIG. 2.
Figure 3:
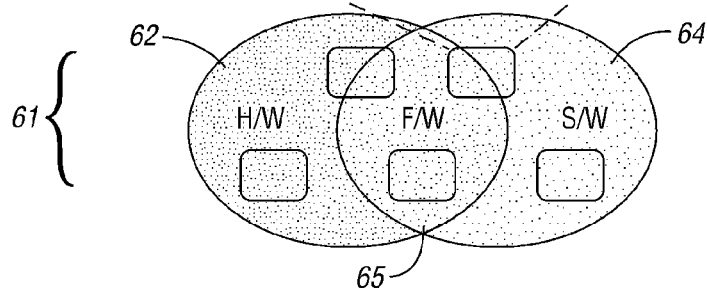

Referring to FIG. 3, a state machine 60 may be used within the architecture of the controller 24 described above. As the DPHM functionality set forth below with reference to FIG. 4 makes use of a finite and/or infinite state machine approach, a state machine 60 is shown for the purpose of illustration. As will be understood by those of ordinary skill in the art, a finite state machine (FSM) is a technique that facilitates design of sequential logic and control functionality. An FSM may be used to design logic circuits, programs, firmware for a microcontroller, as well as pattern recognition and artificial intelligence.

Conceptually, an FSM recognizes that a control system such as the controller 24 of FIG. 2 may operate at any given moment within only in a finite number of states, e.g., open/closed, on/off, moving/stopped, etc. An FSM identifies the significant states of a system, and presents the state transitions in diagram form. FIG. 3 shows a simplified state diagram having different states 66A-E, including an initiation (INIT) state 66A, on and off states 66B and 66C, respectively, and a continuous ($C_T$) operating state 66D. An error state (ERR) 66E is also shown. Each state 66A-66E is joined by arrows 67 representing the particular events causing a change of state. Events may be defined as particular transition conditions or actions causing the state change. Also shown in FIG. 3 are the various implemented state machine types 61 within the controller 24, including hardware (H/W) 62, software (S/W) 64, and firmware (F/W) 65. Thus, FSM techniques may be employed not only at the various control levels of the controller 24, but also as different types within a particular control level.

Figure 4:
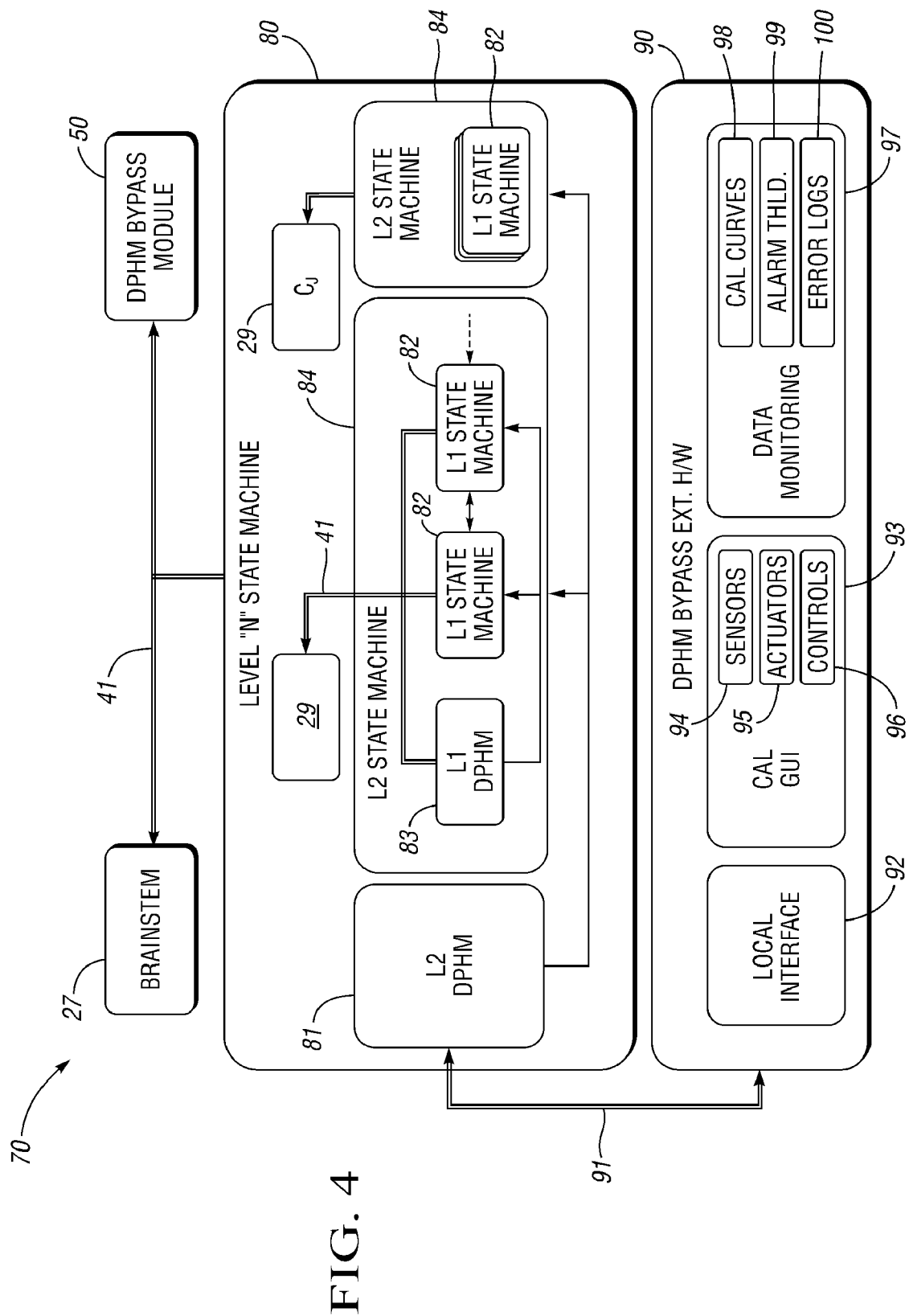
FIG. 4 is a schematic logic flow diagram of the distributed control framework of FIG. 2.

Referring to FIG. 4, a system architecture 70 is shown for embedding DPHM functionality within each of the various levels of the controller 24 of FIG. 2, i.e., via the DPHM modules 37 described above. The brainstem 27 may be connected over a high-speed hardware/software communications bus such as the communications link 41 to the various embedded joint controllers ($C_J$) 29 via the high-speed networks described above, e.g., Ethernet, backplane, M-LDVS bus, etc. While one joint-level controller 29 is shown for simplicity, it is understood that the robot 10 of FIG. 1 would have multiple joint-level controllers, for example one controller 29 for every DOF according to one embodiment. DPHM access to the brainstem 27 may be provided via the module 50 over the link 41. Likewise, DPHM access may be provided to any or all of the joint controllers 29 via the DPHM module 50. Alternately, DPHM access may be provided via a hardware connection 91 with a separate piece of external DPHM bypass hardware 90 as will be described below.

The various control functions of the robot 10 may be broken into N number of state machines, with the $N^{th}$ state machine 80 having various level 1 (L1) state machines 82 each controlling the functionality of a given joint at its lowest or most basic levels. Each L1 state machine 82 may be a constituent part of a high-level state machine, e.g., a level 2 (L2) state machine 84. This series progresses up to the highest-level or $N^{th}$ state machine 80. At each control level, a DPHM bypass module, i.e., DPHM bypass module 50, 81, and/or 83, and optionally the DPHM bypass hardware 90, allows direct access to the various state machines 82, 84 for diagnostics, prognostics, and health management using the tools described below.

The optional DPHM bypass external hardware 90 may be used to provide substantially redundant DPHM functionality to the DPHM module 50 and its constituent bypass control levels, i.e., L1 DPHM module 83 and L2 DPHM module 81. Use of the hardware 90 may be particularly useful when the communications links 41 are interrupted or down, an event that would otherwise render DPHM functions impossible to conduct. In such an instance the hardware 90, e.g., a laptop computer or mobile electronic device, may be connected at any desired level to the state machine 80 via hardware connection 91 using a local interface 92. For example, local interface 92 may be configured as an RS-232 serial communication port or a USB port, or any other port providing a direct plug-and-play connection to hardware 90.

The hardware 90 may include a calibration GUI 93 providing analog parameters calibration and bit-setting capability. Such a GUI may include a set of options for directly and intuitively accessing one or more sensors 94, actuators 95, and software, hardware, and/or firmware-level controls 96 used to control the robot 10 of FIG. 1 at the joint level. For example, logical access may be provided to the state machines 82, 84 described above through these intuitive options. The hardware 90 may also include arbitrarily-structured complex data monitoring and control options to facilitate each of the constituent areas of functionality, i.e., diagnostics, prognostics, and health management. For example, options may include access to a set of calibration curves 98, alarm and/or error threshold data 99, and error/crash logs 100, each of which may be accessed to determine the relevant prognostic, diagnostic, or health management information.

Still referring to FIG. 4, the embedded DPHM modules and resultant functionality may be applied across a host of areas, including: (a) fault detection, (b) diagnostics, (c) prognostics, and (d) health management. Within each area, various algorithm-based approaches may be used to collect and analyze data, including: physics or model-based approaches, artificial intelligence, machine learning, reliability and probability/statistics-based approaches, and system-specific approaches.

For example, within area (a) or fault detection, one may utilize kinematic-based parameters, bounds, and state verification models, case-based reasoning (artificial intelligence), or clustering (machine learning). In terms of reliability, control charts or linear regression methods may be employed, while at the system level signal-to-noise rations may be automatically calculated and recorded, as well as bit error rates in the various communications channels, error logs, etc.

Within area (b) or diagnostics, one may utilize cause-effect relationship models, or finite/infinite state machines (artificial intelligence) as explained above with reference to FIG. 3. Machine learning may be provided via decision trees. In terms of reliability, one may implement logistic regression methods to diagnose detected faults or predetermined fault conditions. At the system level, one may employ dedicated sensors, bit flipping, hardware and/or software torque fail safe approaches, etc.

Fail safe operations may include, in no particular order, (i) logging, reporting and signaling of abnormal situations to an upper level system or the user/operator, and/or activating a suitable visual indicator such as a light emitting diode (LED) indicating system status, (ii) disabling or removing power to an actuator, (iii) activating parking brakes so a particular joint will not move to an unsafe position, (iv) going into a compliant mode, where the torque, pressure, and proximity sensors are used to simulate a joint that poses no resistance to an applied pressure, possibly including a predetermined passivity state, e.g., placing a joint in a passive or a semi-passive state. Such a passivity state may include a gravity-compensation mode or state preventing the robot from going limp, and/or (v) turning off particular control modules that could be at an elevated risk, e.g., at risk of overheating or overloading. The gravity-compensation mode may pose a negligible or near-zero level of resistance to an external force applied to at least one of the compliant robot joints, e.g., maintaining a calibrated amount of gravity compensation for a threshold minimal weight of the humanoid robot at the particular joint being gravity-compensated.

As noted above, the robotic system may include at least three encoders per compliant joint, including a pair of absolute encoders 69A and an incremental encoder 69I. The absolute encoders 69A may be configured as relatively high-resolution, low-speed encoding devices. The incremental encoder 69I may be a relatively low-resolution, high-speed device. Upon initialization of the robot 10 of FIG. 1 or at other predetermined events, the readings of the absolute encoders 69A may be compared. If the difference between readings falls outside of a threshold range, the robotic system may enter a fail-safe mode as described above.

All modules/nodes may constantly exchange messages with the system commander 25 of FIG. 2 via a normal control command and a heartbeat command. If the live connection is lost, then such modules may revert to a fail-safe mode or state. At the joint level, configuration parameters may be used to execute the required series of movements. Every time a new set of parameters is downloaded to the lower level controllers, e.g., the controllers 29, they report a parity code to determine if the parameters are still valid or if they have been corrupted for any reason. If the control parameter integrity is not kept, the node may enter a fail-safe mode.

Additionally, given the mechanical and electrical complexity of the humanoid robot 10 shown in FIG. 1, another diagnostic tool is an automated set of repair, inspection, and assembly positions enabling a user, operator, or maintenance personnel to position the compliance joints in appropriate locations and/or orientations where the control boards can be accessed for both observing any visual signals and for replacing modules if necessary. For communications integrity, preset levels may be chosen based on historical information, e.g., a threshold error rate, to indicate degrading system conditions, for example grounding issues, loose wires, loose connectors, or other electrical problem. Trend information may be extrapolated to provide a prognostic metric of system life expectancy under current conditions.

For the control of servo motors used for moving the fingers 19 of FIG. 1, standard encoders may be complemented with virtual encoders driven from the commutation signals in open/closed loop controls to diagnose the state of the system at all times. As redundant feature for the software tendon control, limit switches may be used to set hard limits for the actuator position in case there is a failure or an electrical or mechanical overload of the device.

Within the prognostics area, one may utilize cumulative damage models, while fuzzy logic may provide sufficient prognostic value at the artificial intelligence level. Machine learning may be achieved via temporal data mining, neural networks, and the like. In terms of reliability, one may employ fleet management techniques, Kalman filtering, etc. At the system level, one may provide "sacrificial canary" devices such as redundant wiring, sensors, integrated controllers, etc.

Within area (d) or health management, integrated life cycle management techniques may be executed at the model, artificial intelligence, machine learning, and reliability levels based on the collective information determined in support of the fault detection, diagnostic, and prognostic functions described above. Likewise, system maintenance actions or schedules and risk response may be optimized to ensure continuous operating health of the robot 10 of FIG. 1. System-level actions may include, by way of example, integrated power system management to optimize power distribution and use across the various joint-level and higher controls and operations.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
    a robot having a plurality of integrated system components, including a plurality of compliant robotic joints, actuators each connected to and configured to move a respective one of the robotic joints, and sensors that measure control and feedback data at a plurality of control points of the robotic system; and
    a controller in communication with the integrated system components, and having distributed control levels, wherein the controller is configured to control the integrated system components using information from the sensors, via the multiple distributed control levels, over multiple high-speed communication networks;
    wherein the controller includes a finite state machine (FSM) having hardware, software, and firmware, and further includes a plurality of embedded diagnostic, prognostic, and health management (DPHM) modules, at least one of which is embedded within each of the integrated system components, each of the DPHM modules being configured to measure and control, using the at least one FSM, DPHM data and system behavior for a respective one of the integrated system components, and to record the DPHM data in a memory location that is accessible over the high-speed communication networks.

2. The robotic system of claim 1, wherein the DPHM modules collectively provide DPHM functionality at all software and hardware levels of the robotic system.

3. The robotic system of claim 1, wherein the controller is configured to use the DPHM modules to automatically default the robot to a fail-safe mode in response to a predetermined fault condition.

4. The robotic system of claim 3, wherein the controller is configured to execute, via the DPHM modules and the at least one FSM, in response to the predetermined fault condition, at least one of: reporting of a system status, activation of an indicator device, disablement of at least one of the integrated system components, and prevention of at least one of the joints from moving to a threshold position.

5. The robotic system of claim 1, further comprising a DPHM hardware device connected at any of the distributed control levels and configured to directly access information stored within any of the DPHM modules without communicating across any of the high-speed communication networks.

6. The robotic system of claim 1, further comprising multiple hardware control modules each providing a different dedicated function for execution by the humanoid robot, wherein a corresponding one of the DPHM modules is embedded within each of the hardware control modules.

7. The robotic system of claim 1, wherein the robot has at least 42 degrees of freedom.

8. A controller for use with a humanoid robot having a plurality of integrated system components including a plurality of compliant robotic joints, actuators, and sensors configured to measure control and feedback data at a corresponding one of the integrated system components, the controller comprising:
    multiple distributed control levels, each having a hardware control module;
    a finite state machine (FSM) having hardware, software, and firmware, wherein each of the DPHM modules interfaces directly with the FSM; and
    multiple high-speed communication networks;

wherein each hardware control module includes a plurality of diagnostic, prognostic, and health management (DPHM) modules, at least one of the DPHM modules being embedded within each of the integrated system components at each of the distributed control levels, and wherein each of the control modules, using a respective one of the DPHM modules, is configured to measure and control DPHM data and system behavior for the respective integrated system component, and to record the DPHM data in a location that is accessible over the communication networks.

9. The controller of claim 8, wherein the DPHM modules collectively provide DPHM functionality at all software and hardware levels of the robotic system.

10. The controller of claim 8, further comprising a DPHM hardware device that directly accesses information stored within any of the DPHM modules without using any of the high-speed communication networks.

11. The controller of claim 8, wherein the sensors include a pair of position encoders, and wherein at least one of the control modules, via one of the DPHM modules is configured to enter a fail-safe mode when a difference in the values from the pair of position encoders exceeds a calibrated threshold value.

12. The controller of claim 8, further comprising a plurality of control modules each providing a dedicated function for execution by the humanoid robot, wherein one of the DPHM modules is embedded within each of the control modules.

13. The controller of claim 12, wherein the plurality of control modules include each of a haptic sensing module and a vision sensing module.

14. A method of controlling a robot within a robotic system having a plurality of integrated system components, including a plurality of compliant robotic joints, actuators, and sensors that measure feedback data at a corresponding one of the robotic joints, the method comprising:
- configuring a controller with multiple control levels and multiple high-speed communication networks;
- embedding a DPHM module within each of the integrated system components;
- using the DPHM modules to measure DPHM data within each of the control levels;
- using a finite state machine (FSM) in at least one of the control levels to measure and control, via the DPHM modules, DPHM data and system behavior for the integrated system components, wherein the FSM includes hardware, software, and firmware; and
- recording the DPHM data in a memory location that is accessible over at least one of the high-speed communication networks.

15. The method of claim 14, wherein using the DPHM modules to measure DPHM data includes automatically defaulting the robotic system to a fail-safe mode when the DPHM module determines the presence of a predetermined fault condition.

16. The robotic system of claim 15, wherein defaulting to a fail-safe mode includes at least one of: reporting a status, activating an indicator device, disabling power to at least one of the integrated system components, and preventing at least one of the compliant robotic joints from moving to an unsafe state, placing at least one of the compliant robotic joints in a predetermined passivity state.

17. The robotic system of claim 16, wherein defaulting to a fail-safe mode includes placing the joint in a predetermined passivity state, the predetermined state being a gravity-compensating state maintaining a calibrated amount of gravity compensation for a threshold minimal weight of the humanoid robot.

\* \* \* \* \*